US007679486B2

(12) United States Patent
Okada (10) Patent No.: US 7,679,486 B2
(45) Date of Patent: Mar. 16, 2010

(54) IN-VEHICLE ANTITHEFT DEVICE AND CENTRAL AUTHENTICATION DEVICE

(75) Inventor: Hiroki Okada, Toyota (JP)

(73) Assignee: Toyota Hidosha Kabushiki Kaisha, Toyota (JP)

( * ) Notice: Subject to any disclaimer, the term of this patent is extended or adjusted under 35 U.S.C. 154(b) by 1140 days.

(21) Appl. No.: 11/216,079

(22) Filed: Sep. 1, 2005

(65) Prior Publication Data

US 2006/0049962 A1    Mar. 9, 2006

(30) Foreign Application Priority Data

Sep. 8, 2004    (JP)    ............................. 2004-261237

(51) Int. Cl.
*G08G 1/00*    (2006.01)
(52) U.S. Cl. .................. 340/5.72; 340/426.1; 340/901; 340/5.42; 307/10.2; 307/10.4; 307/10.5
(58) Field of Classification Search ................ 340/825, 340/901, 904, 426.23, 426.16, 825.49, 5.72, 340/5.42, 5.28; 455/411; 307/10.2, 10.4, 307/10.5
See application file for complete search history.

(56) References Cited

U.S. PATENT DOCUMENTS

| | | | | |
|---|---|---|---|---|
| 4,096,440 A | * | 6/1978 | Okasaka .................. 455/422.1 |
| 5,187,352 A | * | 2/1993 | Blair et al. ................. 235/382 |
| 5,557,254 A | * | 9/1996 | Johnson et al. ........ 340/426.19 |
| 5,754,946 A | * | 5/1998 | Cameron et al. ........... 340/7.22 |
| 5,815,557 A | | 9/1998 | Larson et al. |
| 5,838,251 A | | 11/1998 | Brinkmeyer et al. |
| 6,225,890 B1 | * | 5/2001 | Murphy ................. 340/426.19 |
| 6,240,288 B1 | * | 5/2001 | Wan et al. ................. 455/426.1 |
| 6,549,118 B1 | * | 4/2003 | Seal et al. ................... 340/5.82 |
| 7,058,806 B2 | * | 6/2006 | Smeets et al. ............... 713/166 |

FOREIGN PATENT DOCUMENTS

| | | |
|---|---|---|
| DE | 196 12 026 A1 | 10/1997 |
| DE | 197 53 401 A1 | 6/1999 |
| JP | A 2000-219092 | 8/2000 |
| JP | A 2002-302016 | 10/2002 |
| JP | A 2004-143699 | 5/2004 |

OTHER PUBLICATIONS

U.S. Appl. No. 09/239,339, filed Jan. 28, 1999, Zanelli.

* cited by examiner

*Primary Examiner*—Brian A Zimmerman
*Assistant Examiner*—Yong Hang Jiang
(74) *Attorney, Agent, or Firm*—Oliff & Berridge, PLC (57) ABSTRACT

An in-vehicle antitheft device and a central authentication device can improve a convenience of use of a user while maintaining a high security, which is a merit of a central-type authentication system. A use of a first group of vehicle functions, which has not been permitted, is permitted when an authentication by an in-vehicle local collation part is completed in agreement. A request signal of requesting a user authentication is transmitted to a central authentication device through a communication line. A use of a second group of vehicle functions, which have note been permitted, is permitted when the user authentication is completed in agreement in the central authentication device.

16 Claims, 8 Drawing Sheets

IN-VEHICLE ANTITHEFT DEVICE AND CENTRAL AUTHENTICATION DEVICE

BACKGROUND OF THE INVENTION

1. Field of the Invention

The present invention generally relates to vehicle antitheft techniques and, more particularly, to a vehicle antitheft technique using a central authentication device remote from vehicles.

2. Description of the Related Art

There are known various vehicle security systems as a technique to protect a vehicle from theft by preventing an unauthorized engine start or an unauthorized door opening. There is known, for example, a local-type vehicle antitheft system such as an immobilizer system or a smart key system, which performs an authentication between a vehicle and a key of the vehicle. On the other hand, there is also known a central-type vehicle antitheft system, which performs an authentication between a vehicle and a central device remote from the vehicle (for example, refer to Japanese Laid-Open Patent Application No. 2004-143699). The central-type vehicle antitheft system discloses in this patent document performs an authentication according to ID verification through a communication line between a vehicle and a central device and sends a result of the verification by the central device to the vehicle as an authentication response. If the content of the authentication response indicates an agreement or acceptance, an electronic lock is unlocked.

In the local-type vehicle antitheft system, there is a possibility that a theft of a vehicle may be carried out by stealing an ID stored in an electronic key or an antitheft device or canceling the system itself by a certain illegal or unjust method. On the other hand, in the central-type vehicle antitheft system, the state where functions of the vehicle are not permitted to use cannot be cancelled unless an authentication by the central device remote from the vehicle is not approved. Therefore, as compared with the local-type vehicle antitheft system which consists of only vehicle side parts, the central-type vehicle antitheft system can realize a system having higher security.

However, according to the above-mentioned conventional central-type vehicle antitheft system, a time period spent on the authentication is longer than that of the local-type system, and there are many cases in which a user is given a stress by the waiting time. This is because an authentication can be completed within a several tenths of second in the local-type system while it takes an order of second in the central-type local system for the reason of establishing a communication link or the like.

Moreover, in order to prevent a vehicle theft while parking, it is necessary to energize continuously or periodically an in-vehicle communication module, which is capable of communicating with a central device. For this reason, it is possible that the system itself does not work due to running out of a battery caused by an increase in a dark current while parking. Considering the present communication network as a base, an electric current of several hundreds milliampares is needed, which requires an intermittent operation such as once per every 2 seconds. As a result, it further elongates the time until an authentication is completed.

Further, an authentication via a central device cannot be performed at a location where a radio communication with a central device cannot be established (such as an underground parking lot or a mountain-ringed region). This is because the communication network does not cover all areas where a vehicle can move. Additionally, there are locations where connection with a communication network cannot be achieved, such as a hospital or a theme park, in which a jamming (interference) wave is transmitted intentionally so as to protect equipments.

SUMMARY OF THE INVENTION

It is a general object of the present invention, to provide an improved and useful in-vehicle antitheft device and central authentication device in which the above-mentioned problems are eliminated.

A more specific object of the present invention is to provide an in-vehicle antitheft device and a central authentication device which can improve convenience of use by a user while maintaining high security which is a merit of a central-type authentication system.

In order to achieve the above-mentioned objects, there is provided according to one aspect of the present invention an in-vehicle antitheft device provided in a vehicle, comprising: first permitting means for permitting use of at least one of vehicle functions, which has been unpermitted to use, for a predetermined time period when an authentication by an in-vehicle authentication device is completed in agreement; transmitting means for transmitting a request signal of requesting a user authentication to an exterior of the vehicle through a communication line; and second permitting means for permitting the use of the at least one of the vehicle functions by extending the predetermined time period when the user authentication is completed in agreement in the exterior of the vehicle within the predetermined time period.

According to the above-mentioned aspect of the present invention, the user can start the user of the vehicle function in a very short time by using the authentication performed by the in-vehicle authentication device (that is, a local-type authentication system). Then, if the user authentication in the exterior of the vehicle (that is, a central-type authentication system) within a time period during which the use of the vehicle functions is permitted, the user does not feel a stress even if a time spent on the central-type authentication is long since the use of the vehicle functions has already started. Additionally, if an illegal user causes the local-type authentication to be completed in agreement by a certain method (for example, stealing a correct key), the use of the illegal user can be stopped by the central-type authentication having high security. Further, if the illegal user tries to continuously use the vehicle functions without being subjected to the central-type authentication, such a continuous use cannot be achieved since the time period of use according to the local-type authentication is limited. That is, the convenience of use of the user can be improved while maintaining high security, which is a merit of the central-type authentication system and taking advantage of the local-type authentication system which is a short time completion of the authentication.

Additionally, according to the present aspect of the invention, the in-vehicle antitheft device may further comprise announcing means for announcing a remaining time of the predetermined time period permitted by the first permitting means. Accordingly, even though the time period during which the use of the vehicle functions is permitted is limited, it can be prevented that the use of the vehicle functions is cancelled without notification to the user.

Additionally, there is provided according another aspect of the present invention an in-vehicle antitheft device provided in a vehicle, comprising: first permitting means for permitting use of at least one of vehicle functions, which has been unpermitted to use, until the vehicle travels a predetermined distance when an authentication by an in-vehicle authentication device is completed in agreement; transmitting means for transmitting a request signal of requesting a user authentication to an exterior of the vehicle through a communication line; and second permitting means for permitting the use of the at least one of the vehicle functions by extending the predetermined distance when the user authentication is completed in agreement in the exterior of the vehicle until the vehicle travels the predetermined distance.

According to the above-mentioned aspect of the present invention, the user can start the use of the vehicle function in a very short time by using the local-type authentication. Then, if the central-type authentication within a time period during which the use of the vehicle functions is permitted, the user does not feel a stress even if a time spent on the central-type authentication is long since the use of the vehicle functions has already started. Additionally, if an illegal user causes the local-type authentication to be completed in agreement by a certain method, the use of the illegal user can be stopped by the central-type authentication having high security. Further, if the illegal user tries to continuously use the vehicle functions without being subjected to the central-type authentication, such a continuous use cannot be achieved since the time period of use according to the local-type authentication is limited. That is, the convenience of use of the user can be improved while maintaining high security, which is a merit of the central-type authentication system and taking advantage of the local-type authentication system which is a short time completion of the authentication.

Additionally, the in-vehicle antitheft device according to the present aspect of the invention may further comprise announcing means for announcing a remaining distance of the predetermined distance permitted by the first permitting means. Accordingly, even though the travel distance for which the use of the vehicle functions is permitted is limited, it can be prevented that the use of the vehicle functions is cancelled without notification to the user.

Additionally, there is provided according to another aspect of the present invention an in-vehicle antitheft device provided in a vehicle, comprising: first permitting means for permitting use of a first group of vehicle functions from among vehicle functions which are unpermitted (not permitted) to use when an authentication by an in-vehicle authentication device is completed in agreement; transmitting means for transmitting a request signal of requesting a user authentication to an exterior of the vehicle through a communication line; and second permitting means for permitting use of a second group of the vehicle functions which are not permitted by the first permitting means when the user authentication is completed in agreement in the exterior of the vehicle when the first group of the vehicle functions are permitted by the first permitting means.

According to the present aspect of the invention, the convenience of use of the user can be improved while taking advantages of each authentication system by separating the vehicle functions of which use is permitted according to agreement in the local-type authentication from the vehicle functions of which use is permitted according to agreement of the central-type authentication. For example, when permitting use of the vehicle functions, that are a door unlock and an engine start, the user can get on the vehicle and start the engine without feeling a stress due to a waiting time for completing the authentication as compared to the case where the central-type authentication is used for permission of use of those vehicle functions. Additionally, since no communication is necessary when starting an engine, a battery does not run out due to an increase in a dark current while parking. Further, an engine start can be carried out even in a location where communication with a central device cannot be made. On the other hand, there are vehicle functions which do not give importance to a length of the time until completion of the authentication but requires higher security to be set. For example, the vehicle function such as "replacement of engine ECU" is assigned as the vehicle function of which use is permitted by agreement in the central-type authentication. It should be noted that "permitting the use of the second group of the vehicle functions which are not permitted by the first permitting means" includes a case where use of a vehicle function temporary permitted by the first permitting means is formally or authentically permitted by the second permitting means.

Additionally, in the in-vehicle antitheft device according to the present aspect of the invention, it is preferable that the second permitting means permits the use of the second group of vehicle functions until a predetermined time period has passed. Alternatively, it is preferable that the second permitting means permits the use of the second group of the vehicle functions until the vehicle travels a predetermined distance.

Accordingly, after the predetermined time has passed or the vehicle has traveled the predetermined distance, the use of the second group of vehicle functions is not permitted. This is because there is no need to continuously permit the vehicle functions requiring high security, which requires the central-type authentication, without limitation. For example, the ECU replacement is not carried out frequently, and if it is permitted without limitation, it is possible that an illegal replacement or theft may be carried out by an illegal user. Thus, the limitation is applied to the permission of use by designating the vehicle functions such as the ECU replacement to the second group of vehicle functions.

Additionally, in the above-mentioned aspect of the present invention, the user authentication in the exterior of the vehicle may be performed by at least one of different user authentication means having different authentication accuracies. Accordingly, the authentication accuracy of the central-type authentication can be changed stepwisely. For example, if a high authentication accuracy is required, the user authentication may be carried out by the user authentication means having a high accuracy or all of the plurality of user authentication means. Or, the authentication accuracy can be changed by combining some of the user authentication means.

Additionally, it is preferable that the in-vehicle antitheft device further comprise table information indicating a correspondence relationship between items of the vehicle functions and authentication accuracies required for use permission of the items, wherein the transmitting means sends the request signal corresponding to the authentication accuracies in accordance with the table information when information regarding the items is input thereto. Accordingly, the user merely input the item of the vehicle functions which the user desires to acquire permission of use so that the user authentication means corresponding authentication accuracy of the item is selected and the user authentication is carried out.

Additionally, the correspondence relationship indicated by the table information is preferably changeable. Accordingly the authentication accuracy required for the permission of use of the item of the vehicle functions can be changed according to the user's preference.

Additionally, the in-vehicle antitheft device may further comprise announcing means for announcing a fact that the user authentication in the exterior of the vehicle was not in agreement. Accordingly, a situation where the user authentication was in disagreement while the user is not noticed thereof can be prevented from being occurred.

Additionally, in the in-vehicle antitheft device, it is preferable that the transmitting means resends the request signal when the user authentication in the exterior of the vehicle was not in agreement. Accordingly, if the authentication cannot be completed well due to a communication failure or a failure in extracting feature amount in a body authentication despite of the correct user, it becomes possible to request the authentication again.

Additionally, it is preferable that a number of times of the resend is limited to a predetermined number of times. Accordingly, it can be prevented that an illegal user retries the authentication for many times.

Additionally, it is preferable that the transmitting means sends the request signal at a predetermined time interval or a predetermined distance interval. Accordingly, even if a communication cannot be performed since the vehicle is in an incommunicable area, a communication can be started immediately with passage of time or when the vehicle moves to a communicable area.

Additionally, it is preferable that the transmitting means sends the request signal when a change from an incommunicable state with the exterior of the vehicle into a communicable state is detected. Accordingly, even if a communication cannot be performed since the vehicle is in an incommunicable area, a communication can be started immediately when the vehicle moves to a communicable area.

Additionally, in the in-vehicle antitheft device, it is preferable that the predetermined distance permitted by the first permitting means for the first time after an ignition is turned off while an incommunicable state with the exterior of the vehicle is set to a distance longer than a travel distance from a last communicable position before turning off the ignition to a position at which the ignition was turned off. Accordingly, if the ignition is turned on in an incommunicable area, the predetermined distance can be extended until the vehicle moves to a communicable area.

Additionally, there is provided according another aspect of the present invention a central authentication device connected to the above mentioned in-vehicle antitheft device, the central authentication device comprising: storage means for storing user information; user authentication means for performing a user authentication in accordance with user authentication information sent from the vehicle and the user information stored in the storage means; and notification means for notifying the in-vehicle antitheft device of a result of the user authentication by the user authentication means.

Additionally, there is provided according to another aspect of the present invention a central authentication device connected to the above-mentioned in-vehicle antitheft device, the central authentication device comprising: storage means for storing different kinds of user information therein; a plurality of different user authentication means having the authentication accuracies corresponding to the different kinds of user information stored in the storage means; and notification means for notifying the in-vehicle antitheft device of a result of the user authentication by at least one of the plurality of user authentication means.

The above-mentioned central authentication device may further comprise table information indicating a correspondence relationship between items of the vehicle functions and the authentication accuracies required for use permission of the items, wherein the notification means notifies the in-vehicle antitheft device of a result of the user authentication performed by the user authentication means having the authentication accuracy determined in accordance with the table information. The correspondence relationship indicated by the table information may be changeable.

In the above-mentioned central authentication device, the notification means may notify the in-vehicle antitheft device of a result of the user authentication by regarding that the user authentication is completed in agreement, when there is permission information from a correct user, irrespective of whether or not the user authentication is completed in agreement.

The central authentication device according to the present invention may further comprise abnormality detecting means for notifying of an occurrence of an abnormality in the vehicle when a movement of the vehicle is detected for a time longer than a predetermined time period or a distance longer than a predetermined distance after the user authentication is completed in disagreement, and requesting the vehicle to transmit vehicle position information.

In the above-mentioned central authentication device, the user authentication means may use authentication again when the user authentication does not satisfy a predetermined agreement benchmark but satisfies a predetermined quasi-agreement benchmark that is expanded on a disagreement side.

Other objects, features and advantages of the present invention will become-more apparent from the following detailed description when read in conjunction with the accompanying drawings.

DETAILED DESCRIPTION OF THE PREFERRED EMBODIMENTS

A description will now be given, with reference to the drawings, of embodiments of the present invention.

First Embodiment

Figure 1:
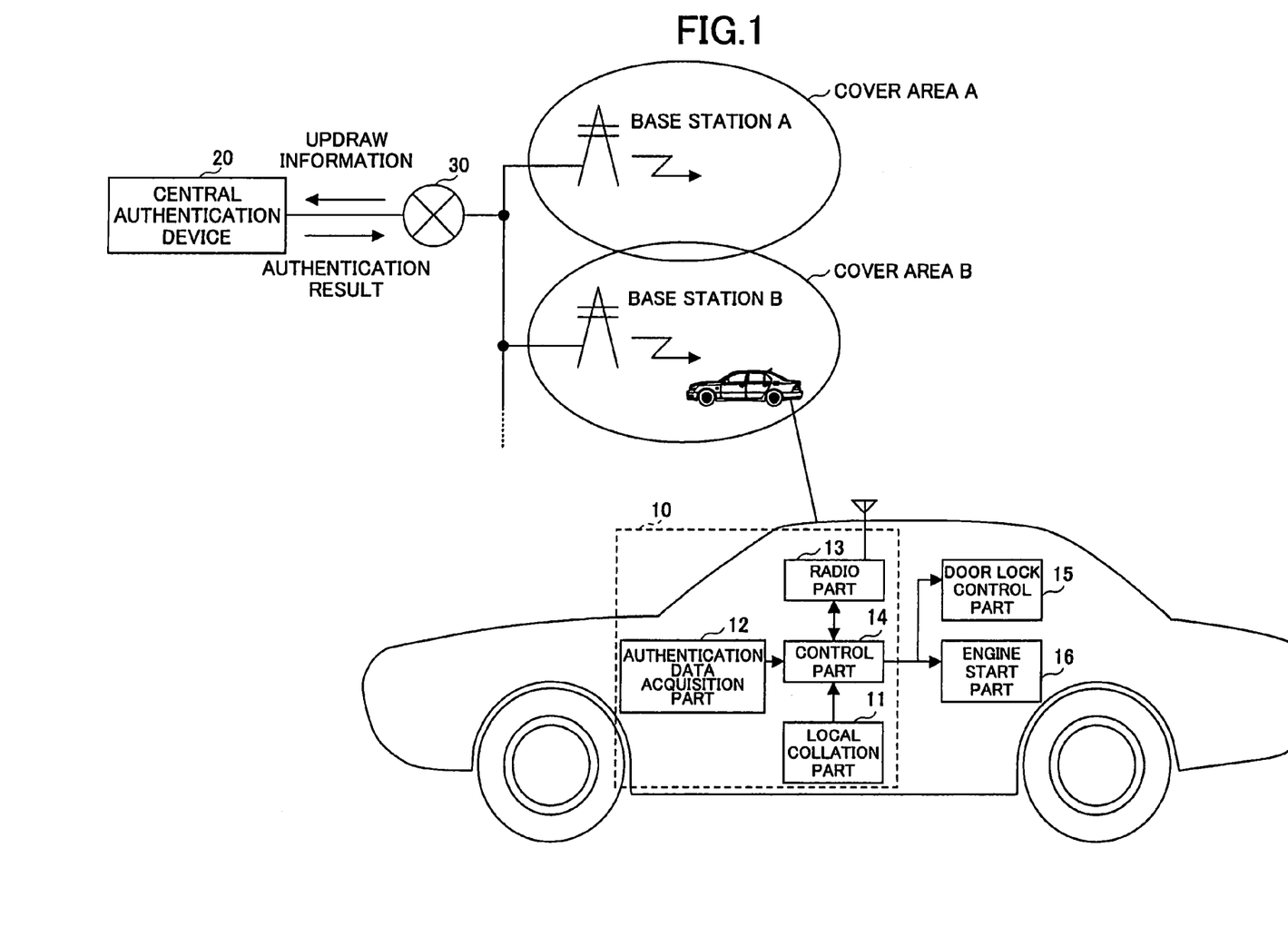
FIG. 1 is an illustration showing a vehicle antitheft system using an in-vehicle antitheft device and a central authentication device according to a first embodiment of the present invention.

FIG. 1 is an illustration showing a structure of a vehicle antitheft system using an in-vehicle antitheft device and a central authentication device according to a first embodiment of the present invention. The in-vehicle antitheft device 10 is provided to a vehicle. The vehicle antitheft device 10 comprises a local collation part 11, an authentication data acquisition part 12, a radio part 13 and a control part 14.

The local collation part 11 serves as an in-vehicle authentication device. When unlocking a door lock or starting an engine, the local collation part 11 performs an authentication (hereinafter, referred to as a local authentication) by performing an ID collation electrically with a mechanical key or a smart key using a radio wave so as to check whether the key is a correct key for the vehicle. Then, the local collation part 11 sends an authentication result of the local authentication to the control part 14 mentioned later.

The authentication data acquisition part 12 acquires user authentication information corresponding to a user authentication (hereinafter, referred to as a central authentication) performed by a central authentication device 20 that is remote from the vehicle. The central authentication is a check as to whether or not a person subjected to the user authentication is a correct user in accordance with the user authentication information sent from the vehicle and user information stored in the central authentication device 20. The user information includes information specific to a correct user, information which only a correct user knows or the like. For example, if the central authentication is a PIN (Personal Identification Number) code, that is, a user authentication according to a secret identification code or a password number, the authentication data acquisition part 12 is a keyboard, a touch display panel or the like through which the PIN code or the password can be input. In addition, for example, if the central authentication is according to a fingerprint collation, the authentication data acquisition part 12 may include a fingerprint reading device. If it is an iris identification, a handwriting identification, a venous identification or a face pattern identification, the authentication data acquisition part 12 may include a camera. If it is a voice identification, the authentication data acquisition part 12 may include a microphone.

The radio part 13 enables a radio communication with the central authentication device 20 through a communication line 30 including a public communication network (for example, a cellular-phone communication network). That is, the radio part 13 transmits and receives authentication information and control signals between a vehicle and the central authentication device 20. For example, a request signal requesting a central authentication, the user authentication information and a result of a user authentication are transmitted and received. The communication line 30, which connects the central authentication device 20 to vehicles, consists of a p plurality of base stations A, B, etc., so that each of the communication base stations has charge of a radio-communicable cover area. If a vehicle is within the area, the central authentication is possible. It should be noted that only one central authentication device 20 may be located at a predetermined location, or it may be located at each region like an FM broadcast station.

A door lock control part 15 controls locking or unlocking doors in accordance with a control signal from the control part 14. Additionally, an engine start part 16 controls whether to permit or prohibit an engine start in accordance with a control signal from the control part 14. The permission or prohibition of the engine start includes setting and unsetting an immobilizer or locking and unlocking a steering.

The control part 14 is connected to each of the local collation part 11, the authentication data acquisition part 12, the radio part 13, the door lock control part 15 and the engine start part 16. The control part 14 performs a control of realizing the functions of the in-vehicle antitheft device 10 by transmitting and receiving control signals mutually. There is an antitheft mode among control modes of the in-vehicle antitheft device 10. The control part 14 performs a change control of the antitheft mode. The antitheft mode includes an unpermission mode, a vehicle permission mode and a central permission mode. The unpermission mode is for not permitting use of vehicle functions so as to prevent theft of the vehicle.

The vehicle permission mode (in the first embodiment, hereinafter, referred to as a temporary permission mode) in the present first embodiment is a mode to permit use of a vehicle function, of which use was unpermitted, for a predetermined period. When a local authentication by the local collation part 11 is completed in agreement, the control part 14 changes from the unpermission mode to the temporary permission mode. Then, the door lock control part 15 unlocks a door, and the engine start part sets a condition in which an engine start is permitted. On the other hand, if the local authentication by the local collation part 11 is completed in disagreement, the control part 14 does not change to the temporary permission mode, and, therefore, the door is maintained locked and an engine start is maintained unpermitted.

The central permission mode (in the first embodiment, hereinafter referred to as an authentic permission mode) in the present first embodiment is a mode to permit use of the vehicle function by extending the predetermined time period permitted in the temporary permission mode. If a central authentication is completed in agreement within the predetermined time period permitted in the temporary permission mode, the control part 14, which received the result of the central authentication through the radio part 13, changes from the temporary permission mode into the authentic permission mode. In accordance with the control signal from the control part 14 to change to the authentic mode, the door lock control part 15 maintains the permission of unlock of the door and the engine start part 16 maintains the permission of an engine start. It should be noted that the extension of the above-mentioned predetermined time period continues unless the user sets unpermission. That is, in the authentic permission mode, an operation and running of the vehicle can be continued without limitation, and the state of permission of use is maintained unless the engine is stopped or the door is locked according to user's wishes.

A description will now be given, with reference to a flowchart of FIG. 2, of an operation of the in-vehicle antitheft device 10 according to the first embodiment of the present invention. It is supposed that the vehicle functions unpermitted to use in the unpermission mode are "door unlock" and "engine start".

Figure 2:
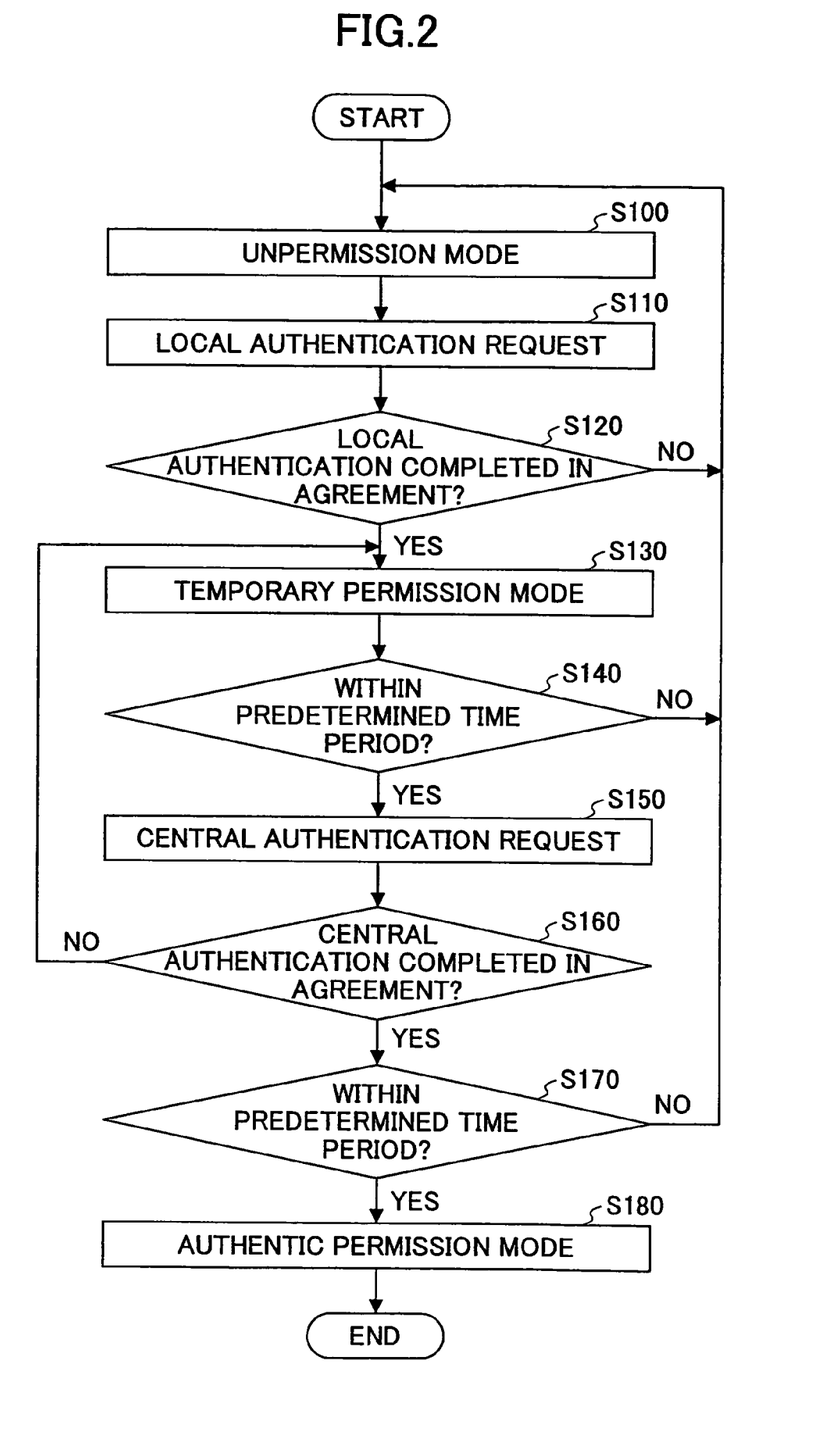
FIG. 2 is a flowchart of a process of shifting from an unpermission mode to an authentic permission mode in the first embodiment.

FIG. 2 is a flowchart of a transition process from the unpermission mode to the authentic mode according to the first embodiment of the present invention. For example, if a vehicle is left or parked without any passengers for a long time, there is a possibility of vehicle theft. Accordingly, a correct user of the vehicle causes the in-vehicle antitheft device 10 to activate before leaving the vehicle. At that time, the antitheft mode is set to the unpermission mode by the control part (step S100).

Then, when the user wishes to drive the vehicle, which is set to the unpermission mode, it is necessary that the local authentication by the local collation part 11 as an in-vehicle authentic device is completed in agreement. The local authentication is achieved by collation between an ID stored in a key possessed by the user and an ID stored in the vehicle (step S110).

In step S120, if the local authentication by the local collation part 11 is completed in disagreement, the antitheft mode is maintained to be the unpermission mode. That is, both the door unlock and the engine start are not permitted. On the other hand, if the local authentication by the local collation part 11 is materialized in step S120, the antitheft mode shifts to the temporary permission mode (step S130). That is, the door unlock and the engine start are temporarily permitted, and the user is permitted to open the door, get on the vehicle and start the engine.

That is, since the vehicle functions, which has been unpermitted to use, are permitted to use for a predetermined time period in the temporary permission mode, the vehicle functions will become unpermitted to use after the predetermined time period is passed. That is after shifting to the temporary permission mode, if the predetermined time period (a time permitted by the local authentication) has passed when performing a determination in step S140, the antitheft mode is returned to the unpermission mode. On the other hand, if the predetermined time period has not passed when performing the determination in step S140, the routine proceeds to step S150.

In step S150, a central authentication request is sent to the central authentication device 20 through a communication line 30. The request for the central authentication may be made after receiving a manual operation input by the user, or may be made automatically after shifting to the temporary permission mode.

If the central authentication completed in disagreement in step S160, the routine returns to step S130 while the temporary permission mode is maintained. Then, if the predetermined time period has passed (step S140), the routine returns to step S100 in which the unpermission mode is set. If the central authentication is completed in agreement in step S160, the routine proceeds to step S170.

In step S170, if the central authentication is not completed in agreement within the above-mentioned predetermined time period, the routine returns step S100 in which the unpermission mode is set. If it is within the predetermined time period, the antitheft mode is shifted to the authentic permission mode in step S180. Thus, an operation and run of the vehicle is permitted continuously without limitation. Thereby, the state of permission of use is maintained unless the engine is stopped or the door is locked by the user's wishes.

Therefore, by using the local authentication, which is completed in a short time, the user can unlock the door without waiting time and start an engine if the local authentication is completed in agreement. Additionally, even if the local authentication is completed in agreement due to an incorrect or unauthorized user has a correct key, the use by the incorrect user can be stopped by using the central authentication having high security. Further, if the incorrect user attempts to continuously use the vehicle without receiving the user authentication by the central authentication, it is impossible to use continuously since the time for permitting use according to the local authentication is limited.

It should be noted that it is determined whether or not it is within the predetermined time period in steps S140 and S170 of FIG. 2, it may be determined whether or not the vehicle run or moved a predetermined distance. The predetermined distance is calculated, for example, based on distance pulses sent to a meter according to a travel of the vehicle with a position of the vehicle when a permission is made by the local authentication is set as a reference. If the distance pulses are not generated because of unrotation of a wheel tire due to tow away by a wrecker or the like, the predetermined distance can be calculated by acquiring an absolute coordinates (latitude and longitude) determined according to a GPS (Global Positioning System) continuously or at a predetermined time interval.

Second Embodiment

Figure 3:
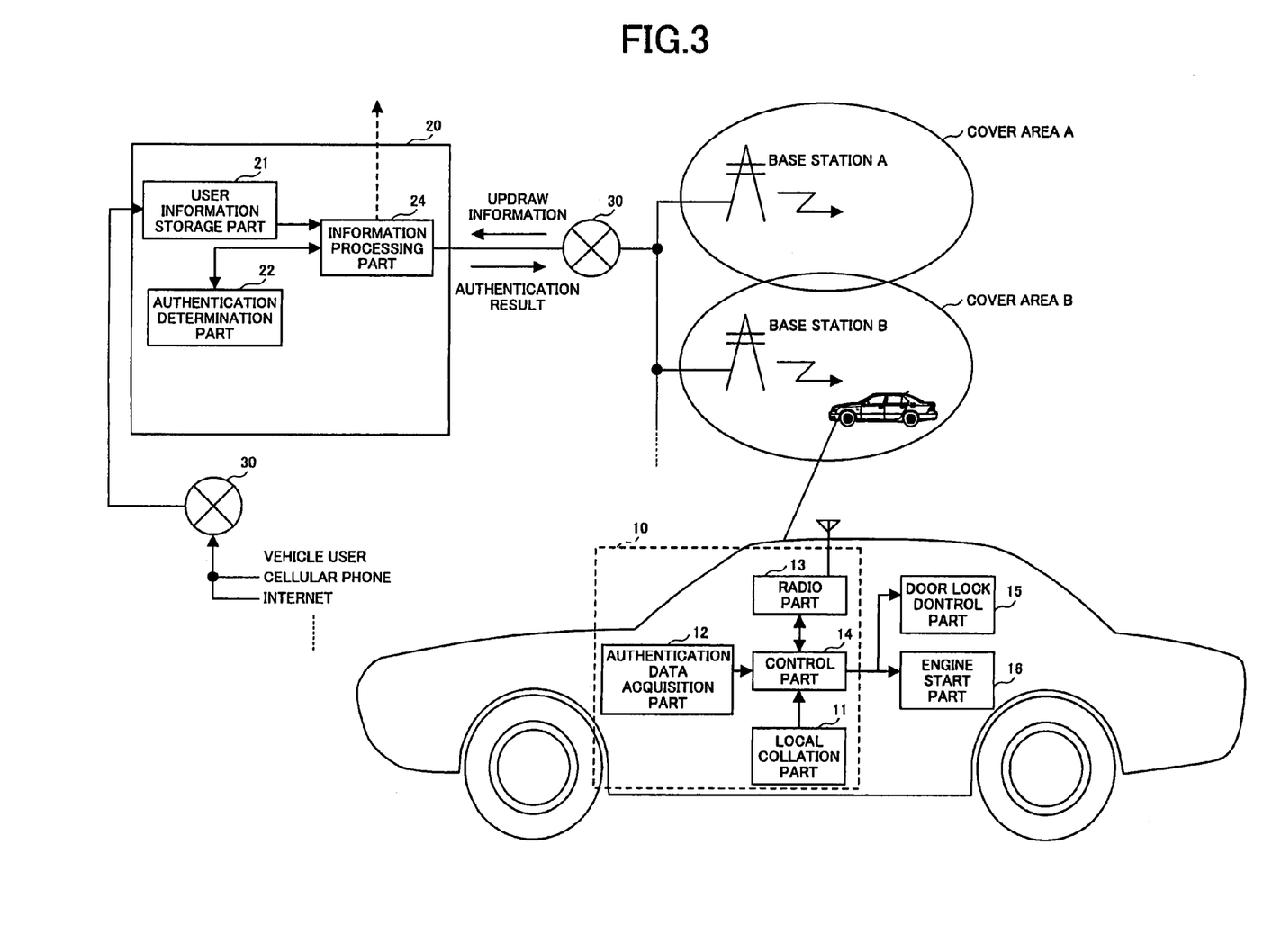
FIG. 3 is an illustration showing a vehicle antitheft system using an in-vehicle antitheft device and a central authentication device according to a second embodiment of the present invention.

FIG. 3 is an illustration showing a structure of a vehicle antitheft system using an in-vehicle antitheft device and a central authentication device according to a second embodiment of the present invention. In FIG. 3, parts that are the same as the parts shown in FIG. 1 are given the same reference numerals, and description thereof will be omitted. The central authentication device 20 according to the second embodiment of the present invention comprises a user information storage part 21, an authentication determination part 22 and an information processing part 24.

The user information storage part 21 stores a plurality of kinds of user information for each user so that different authentication of different authentication accuracies can be performed. As the user information, there is information specific to a correct user or information which only a correct user can know. The user information stored includes a PIN code or a password previously set by a user or fingerprint information, iris information, venous information of a hand, face arrangement pattern information or voiceprint information of a correct user. It is possible to determine whether or not a person being subjected to the user authentication is a correct user in accordance with the aforementioned user information and user authentication information sent from a vehicle.

The information processing part 24 receives the user authentication information transmitted through the communication line 30 from a vehicle. The user authentication information is authentication data acquired by the authentication data acquisition part 12 of the vehicle. Moreover, the information processing part 24 retrieves user information stored in the user information storage part 21 according to the kind of the user authentication information. Then, the received user authentication information and the retrieved user information are input into the authentication determination part 22 by the information processing part 24.

The authentication determination part 22 as user authentication means performs a user authentication by comparing both the above-mentioned sets of information input by the information processing part 24. That is, the user authentication is performed as to whether or not the user having the user authentication information transmitted from the vehicle is a correct user. Then, the result of the user authentication by the authentication determination part 22 is sent to the vehicle through the information processing part 24.

The authentication determination part 22 has a plurality of user authentication means so that user authentications of different authentication accuracies can be performed. As one example of the plurality of user authentication means, there is a body authentication such as a fingerprint authentication, a face arrangement pattern authentication or an iris authentication. Additionally, a password authentication or a PIN code authentication may be used. If a plurality of user authentication means are provided, it is possible to previously select one of the user authentication means which the user desired to use. For example, if correct user determines that the PIN code input alone is sufficient for the central authentication, the correct user stores a previously set PIN code in the user information storage part 21 so that a result of central authentication is performed only by a collation of the PIN code. On the other hand, if, for example, the correct user determines that an iris authentication, which provides higher accuracy, is needed even if it takes a long time to complete an authentication, the correct user stores iris information of the correct user in the user information storage part 21 so that the central authentication is performed by a collation of the iris information. Further, for example, the central authentication may be set to a combination of the password authentication and the fingerprint authentication, that is, a plurality of use authentication means may be combined so as to acquire higher security. Thus, is it possible to send a result of user authentication by the user authentication means set by a correct user to a vehicle through the information processing part 24.

Figure 4:
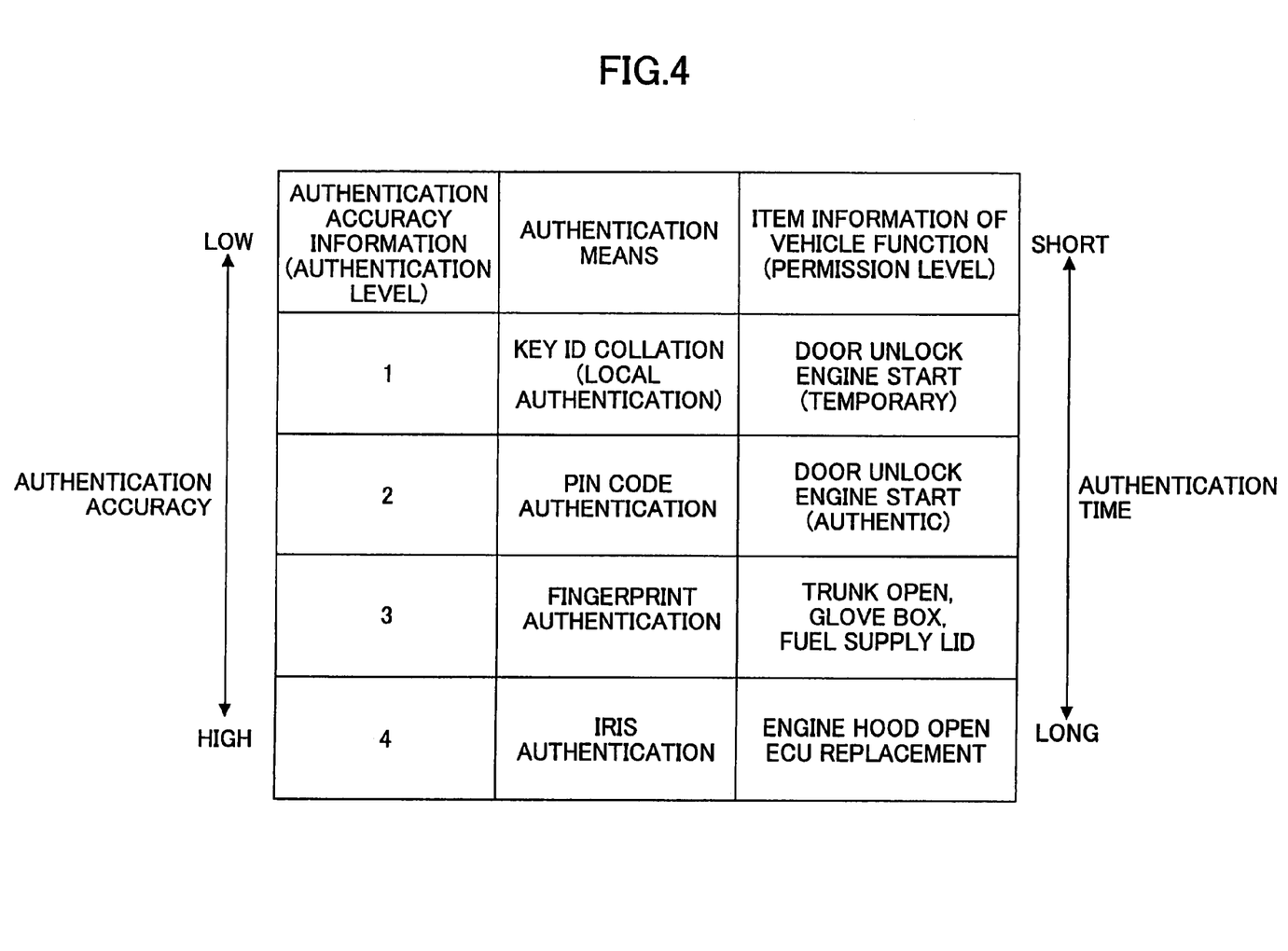
FIG. 4 is a table indicating item information of vehicle functions and corresponding authentication accuracy information required for use permission of the items.

On the other hand, the in-vehicle antitheft device 10 according to the second embodiment has a table such as shown in FIG. 4 in order to enable setup and selection of the user authentication means which a correct user desires. The items of the vehicle functions, which are targets for permission or unpermission, are indicated in the column of vehicle function item information on the right side of the table of FIG. 4. Required authentication accuracy information is related use permission of each item. The authentication accuracy information is an authentication level representing a degree of authentication accuracy. The authentication level is set to, for example, 1 through 4 in accordance with a difference in the authentication accuracy. It shows that the authentication accuracy of the authentication means becomes higher as the value of the authentication level becomes greater. Moreover, as the value of the authentication level increases (authentication accuracy becomes higher), generally the authentication time also becomes longer. Thus, the authentication means corresponding to each value of the authentication level is assigned. Therefore, the table of FIG. 4 shows that the authentication of the authentication level "4" is needed to be completed in agreement in order to permit use of the "ECU replacement" and the "iris authentication" as the authentication means concerned. It should be noted that the contents of the table of FIG. 4 may be fixed beforehand, or the corresponding relationship in the table may be changed according to user's preference. For example, it is possible to set the authentication level corresponding to permission of the "ECU replacement" to the authentication level "2", or the authentication means corresponding to the authentication level "2" may be set to the "fingerprint authentication".

Figure 5:
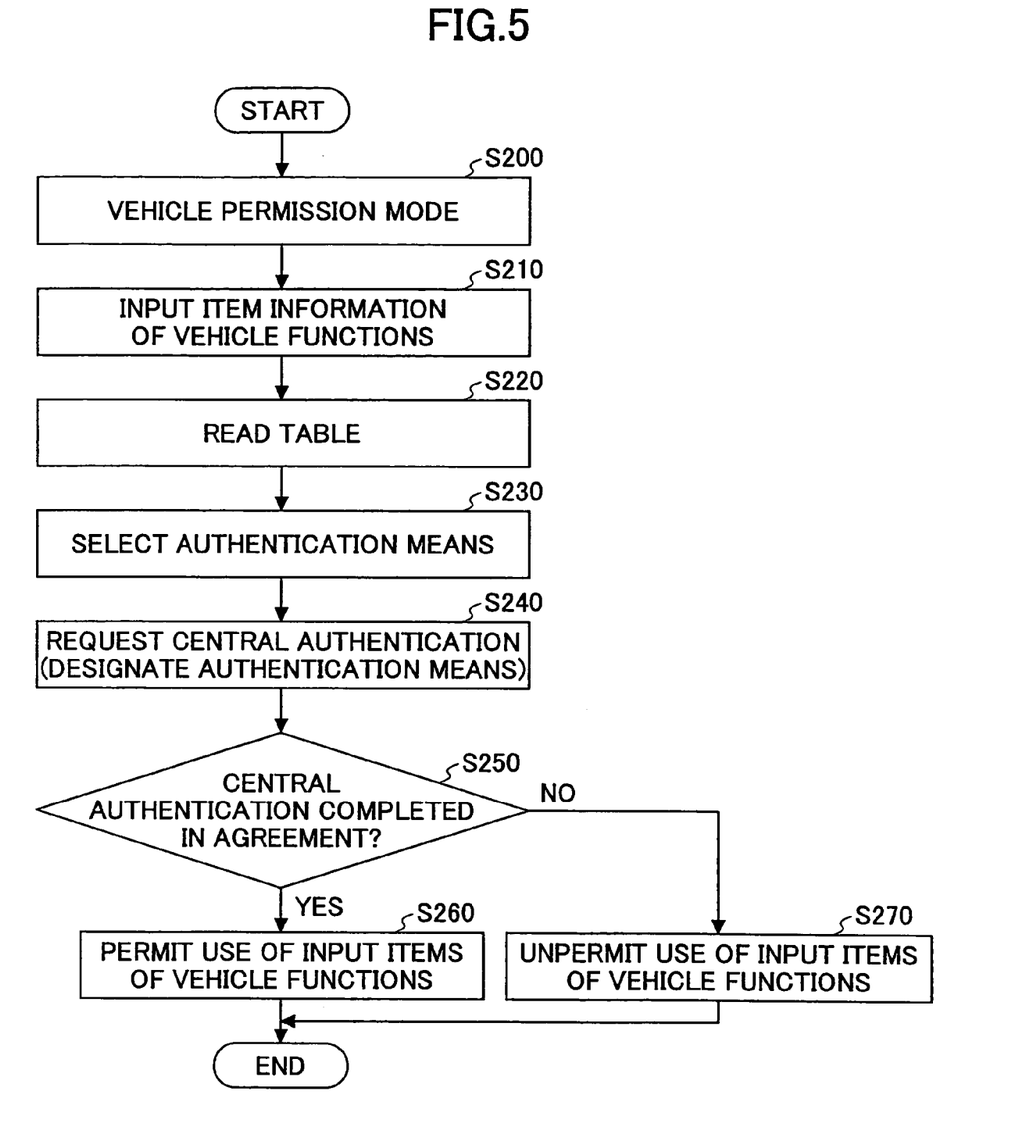
FIG. 5 is an illustration showing an operation of an in-vehicle antitheft device having the table of FIG. 4.

A description will now be given, with reference to a flow-chart of FIG. 5, of an operation of the central authentication using the in-vehicle antitheft device 10 having the above-mentioned table. When the local authentication by the local collation part 11 is completed in agreement, the control part 14 changes the authentication mode from the unpermission mode to the vehicle permission mode (step S200). The vehicle permission mode in the present second embodiment is a mode for permitting use of a first group of vehicle functions among the vehicle functions which are permitted to use according to an agreement in the local authentication. In the present embodiment, the first group of the vehicle functions are the "door unlock" and the "engine start". A user, who was able to get on a vehicle and start an engine, inputs vehicle functions to be permitted to use into the in-vehicle antitheft device 10 through a touch-panel display or the like (step S210). The in-vehicle antitheft device 10 reads the table of FIG. 4 (step S220), and selects the authentication means corresponding to the item of the input vehicle function (step S230). The in-vehicle antitheft device 10 requests the central authentication which designates the selected authentication means through the communication line to the central authentication device 20 (step S240). For example, if the vehicle functional item to be permitted to use is the "glove box", the "fingerprint authentication" is requested to the central authentication. If the central authentication is in disagreement in step S250, the input items of the vehicle functions are maintained unpermitted (step S270). On the other hand, if the central authentication is in agreement in step S250, the input items of the vehicle functions are permitted to use (step S260). Then, the routine of the operation is ended.

By using the in-vehicle antitheft device 10 and central authentication device 20 according to the second embodiment, one of the user authentication means can be selected from among the plurality of user authentication means in accordance with the authentication accuracy of the selected item by merely inputting the item of the vehicle function which a user desires to permit to use. Accordingly, the central authentication is performed by the selected user authentication means, which result in an improvement in convenience of user's use when setting an antitheft function.

Furthermore, by separating the vehicle functions which are permitted to use according to an agreement in the local-type authentication from the vehicle functions which are permitted to use according to an agreement in the central-type authentication, the convenience for user's use can be improved with taking an advantage of each authentication method. For example, the vehicle functions such as "door unlock" or "engine start", which causes a stress to a user due to a waiting time on the authentication, are set as objects to be subjected to the local authentication, while the vehicle functions such as "ECU replacement" or "engine hood open", which requires higher security, are set as objects to be subjected to the central authentication.

It should be noted that the table of FIG. 4 may be provided not to the in-vehicle authentication equipment 10 as mentioned above, but to the central authentication device 20. In such a case, first, a user inputs the item of the vehicle function, which the user desires to permit to use, to the in-vehicle authentication equipment 10. Then, the input item of the vehicle function is transmitted to the central authentication device 20, and the authentication means corresponding to the input item of the vehicle function is selected by the central authentication device 20 using the table of FIG. 4. Then, the central authentication device 20 performs the central authentication according to the selected authentication means, and notifies the in-vehicle antitheft device 10 of the result of the central authentication.

Third Embodiment

Figure 6:
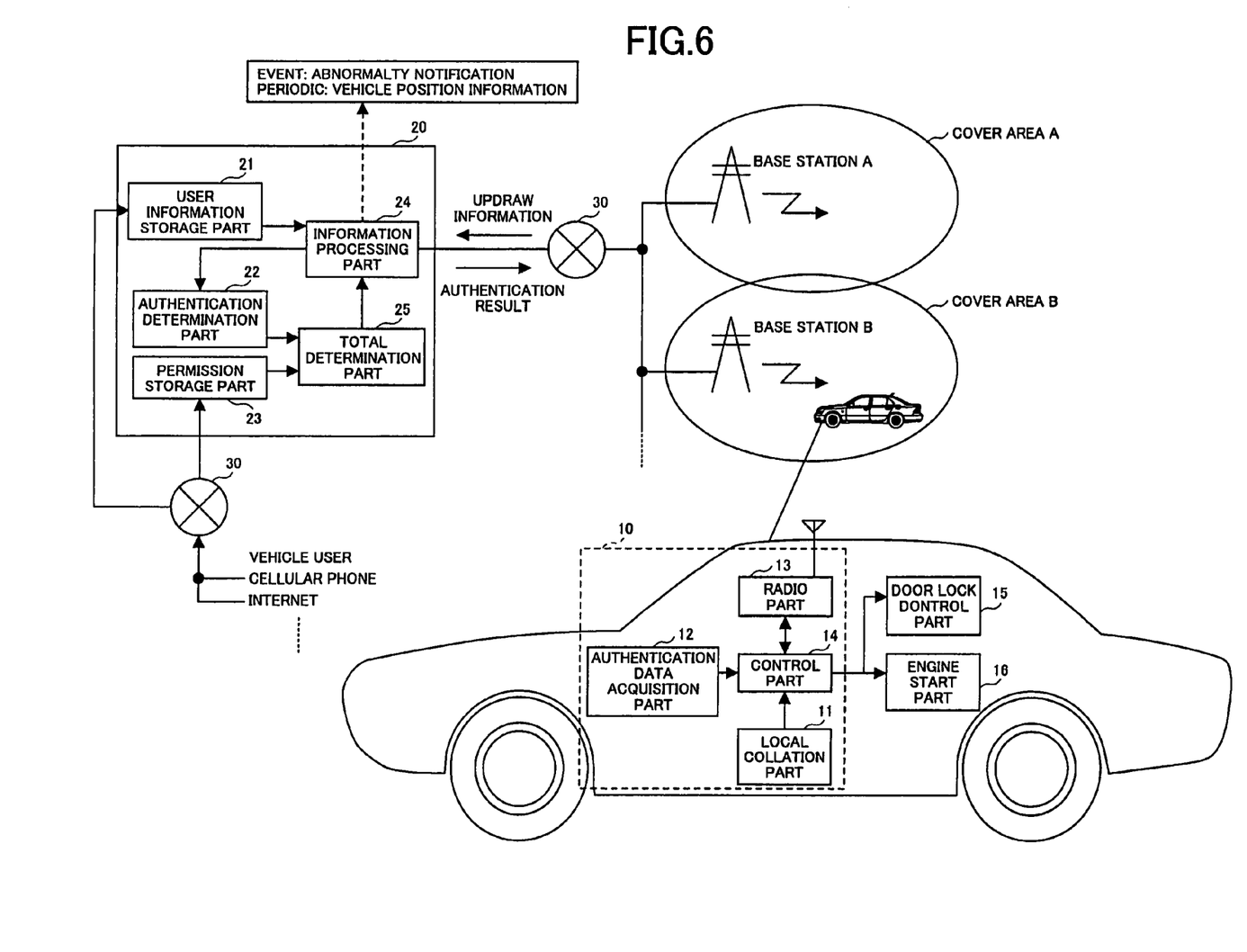
FIG. 6 is an illustration showing a vehicle antitheft system using an in-vehicle antitheft device and a central authentication device according to a third embodiment of the present invention.

FIG. 6 is an illustration showing a structure of a vehicle antitheft system using an in-vehicle antitheft device and a central authentication device according to a third embodiment of the present invention. In FIG. 6, parts that are the same as the parts shown in FIGS. 1 and 3 are given the same reference numerals, and descriptions thereof will be omitted. The central authentication device 20 according to the third embodiment comprises, in addition to the central authentication device 20 according to the second embodiment, a permission storage part 23 and a total determination part 25.

The permission storage part 23 stores information (hereinafter, referred to as temporary permission information) for being capable of permitting use of vehicle functions by supposing as if the user authentication is completed in agreement, exceptionally, even when the user authentication is not in agreement. It is considered that a case in which such an exceptional disposal is needed is a case where a vehicle is lent to a person whose user information is not stored in the central authentication device 20. Before lending a vehicle, a correct user accesses the permission storage part 23 using a cellular phone terminal or a personal computer through the communication line 30 or the Internet so as to store the temporary permission information. The permission storage part 23 can be accessed only by the correct user or a person who is authorized by the correct user so that security is not deteriorated.

Moreover, the permission storage part 23 may be caused to store, in addition to the temporary permission information, a permissible period or a permissible travel distance. Thus, by storing permissible limitations, there is no worry about forgetting a return from the temporary permission state to a normal state, which maintains a minimum risk of being illegally used.

The total determination part 25 determines a final user authentication in accordance with a result of the user authentication by the authentication determination part 22 and the temporary permission information stored in the permission storage part 23. If the temporary permission information is stored, the total determination part 25 regards that the user authentication is in agreement irrespective of whether the user authentication by the authentication determination part 22 is in agreement or not.

Therefore, if the user authentication information sent from a vehicle is information which cannot cause the user authentication by the authentication determination part 22 in agreement, it is regarded that the user authentication is completed in agreement when the temporary permission information is stored, and a notification of the result of the authentication is sent to the vehicle.

By using the in-vehicle antitheft device 10 and the central authentication device 20 according to the above-mentioned third embodiment, a vehicle can be lent without disclosing the user authentication information to other persons when lending the vehicle to other persons whose user information is not stored in the central authentication device within a range the correct user authorizes, which maintains security well.

Fourth Embodiment

A description will be given, with reference to FIG. 6, of a structure of a vehicle antitheft system using an in-vehicle antitheft device and a central authentication device according to a fourth embodiment of the present invention. The vehicle permission mode in the fourth embodiment is a mode for permitting "engine start" within a predetermined time period or predetermined travel distance. The vehicle permission mode is set by the control part 14 from the unpermission mode when the local authentication by the local collation part 11 is in agreement. Additionally, the central permission mode in the fourth embodiment is a mode for permitting use of "engine start" by extending the predetermined time period or elongating the predetermined distance which is permitted in the vehicle permission mode. The central permission mode is set by the control part 14, which received a result of the center authorization through the radio part 13, from the vehicle permission mode when the central authentication is completed in agreement within the predetermined time period or the predetermined distance permitted in the temporary permission mode.

The information processing part 24 in the fourth embodiment includes an abnormality detection means. The abnormality detection means notifies a user or a security company of an occurrence of an abnormality when a movement of a vehicle is detected for a time longer than a predetermined time period or for a distance longer than a predetermined distance after the user authentication by the authentication determination part 22 is in disagreement, and sends a notification to the vehicle to transmit vehicle position information. Alternatively, if it is the central authentication means 20 in the third embodiment, the fact that the temporary permission information is not stored in the permission storage part 23 is added to the conditions. It should be noted that the vehicle position information may be acquired using an in-vehicle navigation system or it is possible to determine a vehicle position in accordance with a communication condition with a base station by using an in-vehicle communication module (radio part 13) which communicates with the central authentication device 20.

A description will be given of an operation of the in-vehicle antitheft device 10 and the central authentication device 20 according to the fourth embodiment when a theft of a vehicle is carried out. Since the local authentication can be completed in agreement if a malicious person steals a vehicle using a correct key illegally obtained, an engine of the vehicle can be started. However, it is natural that use information of the malicious person is not stored in the user information storage part 21, and, thus, the user authentication cannot be in agreement. Accordingly, if the temporary permission information is not stored in the permission storage part 23, the total determination part 25 finally makes a determination that the user authentication is not in agreement. As a result, the abnormality detection means of the information processing part 24 notifies a user or a security company of an occurrence of an abnormality when a movement of the vehicle is detected for a time longer than a predetermined time period or for a distance longer than a predetermined distance, and sends a notification to the vehicle to transmit vehicle position information. It should be noted that there is a case in which a correct user lent a key to another person with agreement but forgot to write temporary permission information in the permission storage part 23. In such a case, if the correct user newly writes the temporary permission information in the permission storage part 23, the total determination part 25 does not make a determination that the user authentication is not in agreement.

By using the in-vehicle antitheft device 10 and the central authentication device 20 according to the fourth embodiment as mentioned above, a stolen vehicle can be found earlier. If the vehicle position information is uploaded periodically, a further earlier detection of the stolen vehicle can be expected.

Fifth Embodiment

When performing the central authentication, a vehicle is not always positioned in a communicable area. If a vehicle is parked outside the communicable area (incommunicable area) by turning off an ignition and, thereafter, the ignition is turned on and the local authentication is completed in agreement, the central authentication cannot be in agreement due to the vehicle in the incommunicable area.

In such a case, the in-vehicle antitheft device 10 according to the fifth embodiment is provided with checking means for checking whether or not the central authentication can be carried out when shifting to a vehicle parking state (for example, engine stop and door lock). Additionally, there is provided storage means for storing information regarding a position where the vehicle was communicable with the central authentication device 20 before parking.

Therefore, if it is found that the central authentication cannot be carried out at the parked position (for example, in a case where the vehicle is at an underground parking lot and communication is interrupted), information regarding the position, at which the vehicle was communicable with the central authentication device 20 before parking, is read from the storage means by going back the run history. Then, when the ignition is turned on again and the local authentication is completed in agreement, which sets the temporary permission mode, the temporary permission mode is maintained until the vehicle reaches the position at which the central authentication can be carried out even if it needs a travel longer than a predetermined distance permitted in the temporary permission mode for the reason that the information of the position at which the vehicle was communicable with the central authentication device 20.

Figure 7:
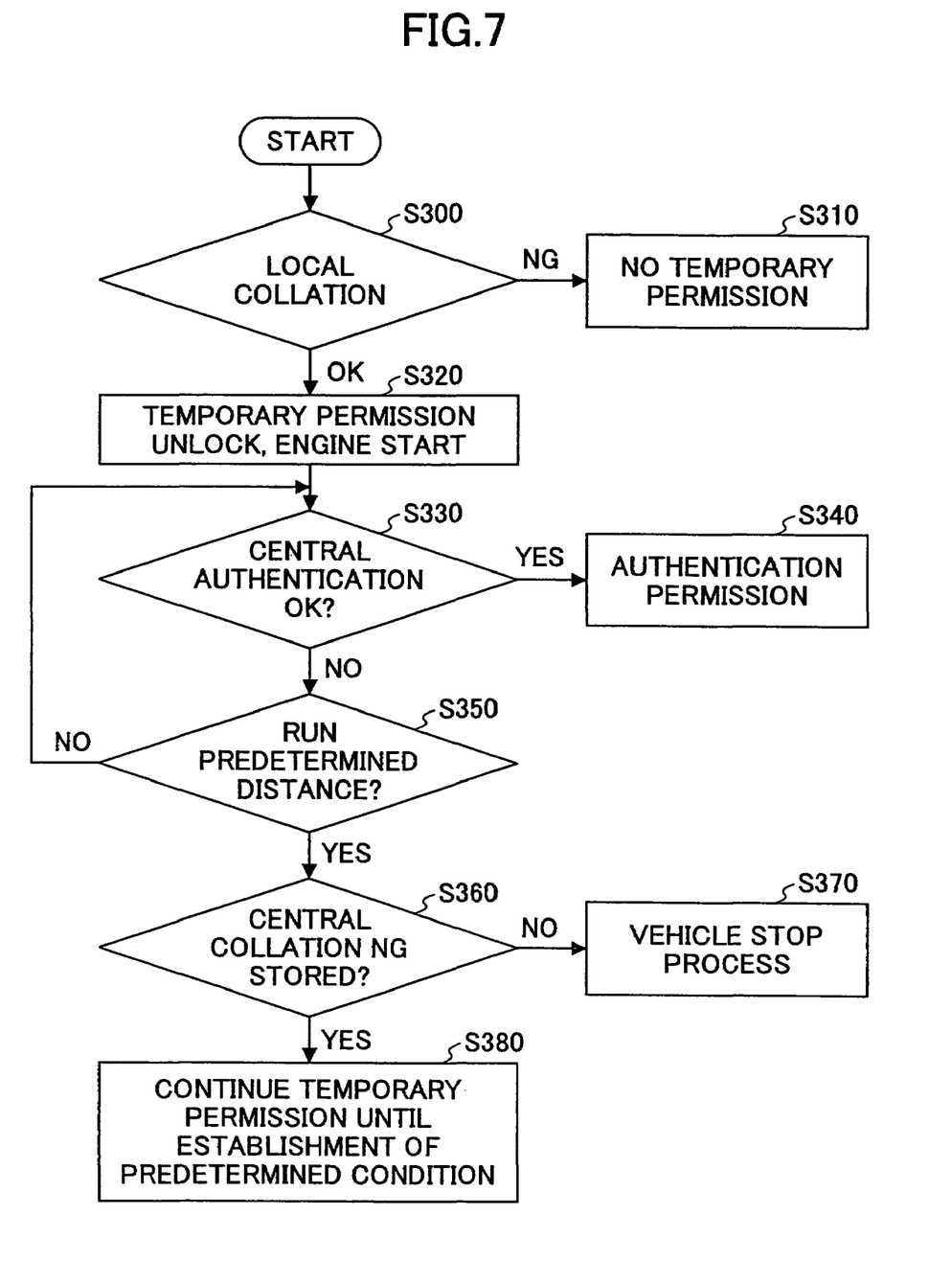
FIG. 7 is a flowchart of a continuation process of a temporary permission mode after parking in a central authentication impossible area.

A description will be given, with reference to FIG. 7, of a case where a vehicle is parked in an incommunicable area. FIG. 7 is a flowchart of a continuation process of the temporary permission mode after a vehicle is parked in a central authentication impossible area. First, an ignition of the vehicle is turned on so as to start the local authentication (step S300). If the local authentication is not in agreement, the temporary permission mode is not set and the unpermission mode is maintained (step S310). On the other hand, if the local authentication is in agreement, the temporary permission mode is set so that a door unlock is permitted and an engine start is permitted (step S320). Then, in order to shift to the authentic permission mode, the central authentication is performed (step S330). If the central authentication is completed in agreement, it is shifted to the authentic mode (step S340). That is, the vehicle is in the communicable area with the central authentication device 20. If the central authentication is not in agreement, the central authentication is carried out repeatedly until the vehicle moves the predetermined distance permitted in the temporary permission mode (step S350). If the central authentication is not in agreement when the travel of the vehicle exceeds the predetermined distance, the routine proceeds to step S360. It is determined, in step S360, whether or not information indicating that the central authentication is not completed in agreement remains. If the information does not remain, a vehicle stop process is performed (step S370). On the other hand, if the information remains, the temporary permission mode is continued until a predetermined condition is established until the vehicle moves to a position at which the central authentication can be carried out) (step S380). It should be noted that the vehicle stop process in step S370 is, for example, to stop the vehicle with passage of time by gradually applying vehicle speed limitation since it is dangerous to stop the engine immediately.

Figure 8:
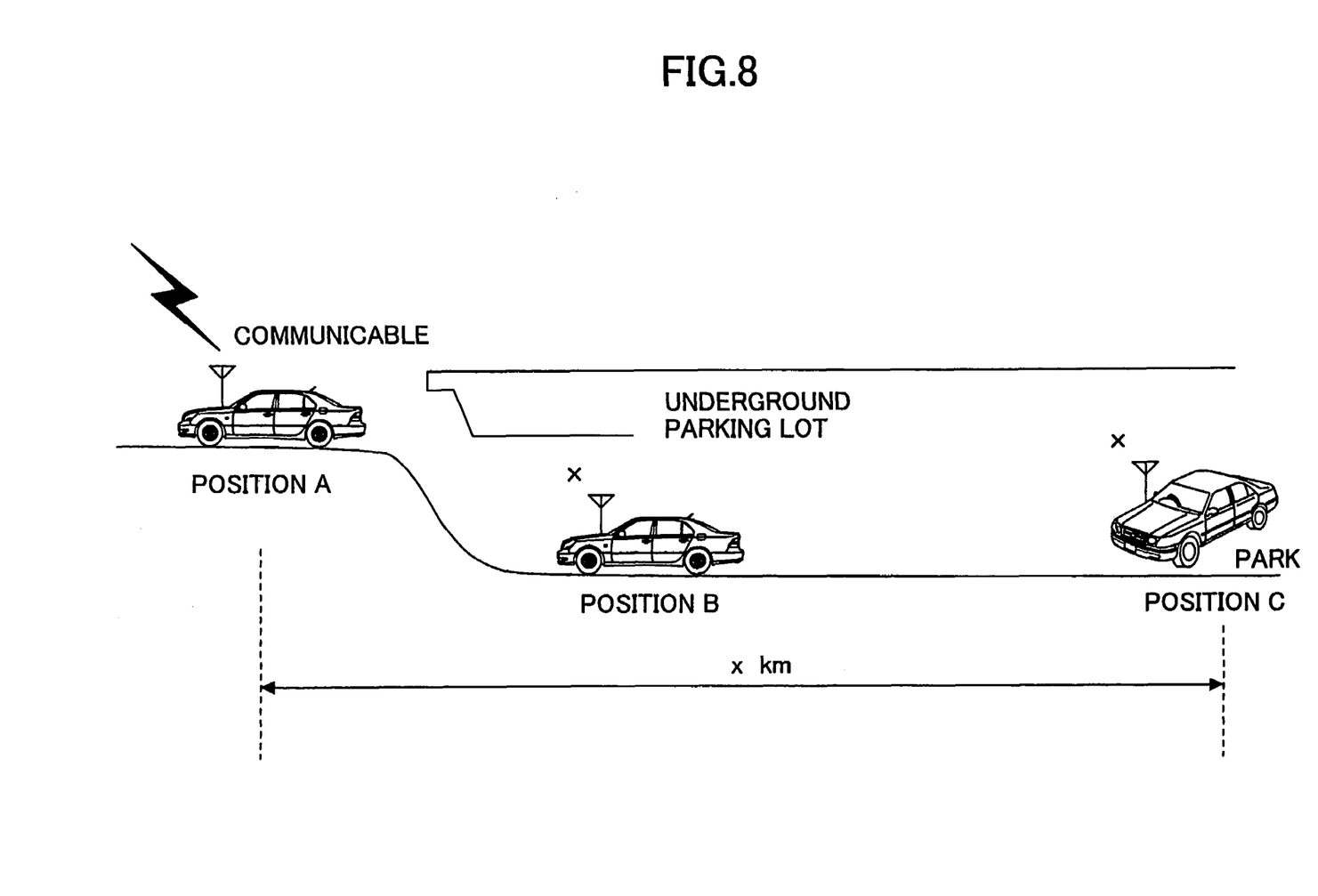
FIG. 8 is an illustration showing a case in which a vehicle is parked in an underground parking lot.

FIG. 8 is an illustration showing parking at an underground parking lot (an incommunicable area with the central authentication device 20). A communication with the central authentication device 20 can be made at a position A. A communication with the central authentication device 20 cannot be made in an area from a point B to a parking point C. A description will be given of a continuation process of the temporary permission mode with reference to two examples (a) and (b).

In the case of (a):

The vehicle stores information regarding a travel distance x (km) from the position A. According to the information of the travel distance, when the temporary permission mode is set since the ignition is turned on and the local authentication is completed in agreement at next time, it is possible to perform the continuation process of the temporary permission mode until the vehicle travels a distance longer than x+α (km) even if the central authentication is not in agreement.

In the case of (b):

By storing absolute coordinate information (latitude and longitude) of a position at which the central authentication can be carried out, it is possible to perform a continuation process of the temporary permission mode until the vehicle reaches the absolute coordinate position again.

It should be noted that the case where the central authentication is not in agreement may include not only a case where the vehicle is stolen as mentioned above or there is a failure in communication but also a case where the authentication information of a user is not correctly acquired. That is, despite of the correct user, there may be generated a difference between the acquired user information and the user information stored n the user information storage part 21, which results in disagreement in the central authentication. Accordingly, it is necessary to provide bailout measure since it is unreasonable for the correct user that use of vehicle functions is not permitted for the reason that the user authentication information is not correctly acquired.

According to the bailout measure, when the central authentication is no in agreement, the in-vehicle antitheft device 10 requests an acquisition of the user authentication information and the central authentication again by an action (switch input, etc) of the correct user. That is, when the authentication is not performed well due to failure in feature amount extraction in a body authentication or the like, the central authentication is retried again from the acquisition of the user authentication information used for the central authentication. However, there is a limitation in the number of retries. For example, in the case of the PIN code input represented by input of four-digit secret code, there is a possibility that someone found a correct code by accident while performing a retry for a plurality of times. Thus, a limitation is set in the number of times so as to not permit a retry more than the limitation in the number of times.

Moreover, depending on vehicle environment, there is a high possibility that a noise is superposed on the acquired user authentication information, and, therefore, there is a case in which the authentication is not in agreement even if the user authentication information is of the correct user. Thus, an error range (quasi-agreement benchmark) which gives a possibility of agreement when performing the authentication again is set. Thereby, if the central authentication is failed but if the user authentication is within the quasi-agreement benchmark, the user authentication is performed automatically again without noticing the user of the failure so that a burden to the user is reduced.

It should be noted that, in the above-mentioned embodiments, the set up and selection of the user authentication which the correct user desires to use can be done by the correct user himself or herself through the communication line 30 or the Internet using a cellular phone, a personal computer or the like. Alternatively, the correct user can make a contact with a management person of the central authentication device 20 so as to ask for changing the setting.

Moreover, the table of FIG. 4 may be displayed on a touch-panel display without changes, and the correct user may change the correspondence relationship freely on the touch-panel display.

The present invention is not limited to the specifically disclosed embodiments, and variations and modifications may be made without departing from the scope of the present invention.

The present application is based on Japanese priority application No. 2004-261237 filed Sep. 8, 2004, the entire contents of which are hereby incorporated herein by reference.

What is claimed is:

1. An in-vehicle antitheft device provided in a vehicle, comprising:
    first permitting means for permitting use of at least one of vehicle functions, which has been unpermitted to use, until said vehicle travels a predetermined distance when an authentication by an in-vehicle authentication device is completed in agreement;

transmitting means for transmitting a request signal of requesting a user authentication to an exterior of said vehicle through a communication line; and second permitting means for permitting the use of said at least one of the vehicle functions by extending said predetermined distance when the user authentication is completed in agreement in the exterior of said vehicle until said vehicle travels said predetermined distance, wherein said predetermined distance is permitted by said first permitting means for the first time after an ignition is turned off while at an incommunicable state with the exterior of said vehicle and is set to a distance longer than a travel distance from a last communicable position before turning off the ignition to a position at which the ignition was turned off.

2. A central authentication device connected to the in-vehicle antitheft device as claimed in claim 1 through a communication line, the central authentication device comprising:

storage means for storing user information;

user authentication means for performing a user authentication in accordance with user authentication information sent from said vehicle and the user information stored in said storage means; and notification means for notifying said in-vehicle antitheft device of a result of the user authentication by said user authentication means.

3. The in-vehicle antitheft device as claimed in claim 1, wherein the user authentication in the exterior of said vehicle is performed by at least one of different user authentication means having different authentication accuracies.

4. The in-vehicle antitheft device as claimed in claim 1, further comprising announcing means for announcing a remaining distance of the predetermined distance permitted by said first permitting means.

5. The in-vehicle antitheft device as claimed in claim 1, wherein said transmitting means resends said request signal when the user authentication in the exterior of said vehicle was not in agreement.

6. The in-vehicle antitheft device as claimed in claim 1, wherein said transmitting means sends said request signal at a predetermined time interval or a predetermined distance interval.

7. The in-vehicle antitheft device as claimed in claim 1, wherein said transmitting means sends said request signal when a change from an incommunicable state with the exterior of said vehicle into a communicable state is detected.

8. The central authentication device as claimed in claim 2, wherein said notification means notifies said in-vehicle antitheft device of a result of the user authentication by regarding that the user authentication is completed in agreement, when there is permission information from a correct user, irrespective of whether or not the user authentication is completed in agreement.

9. The central authentication device as claimed in claim 2, wherein said user authentication means uses authentication again when the user authentication does not satisfy a predetermined agreement benchmark but satisfies a predetermined quasi-agreement benchmark that is expanded on a disagreement side.

10. The in-vehicle antitheft device as claimed in claim 3, further comprising table information indicating a correspondence relationship between items of said vehicle functions and authentication accuracies required for use permission of the items, wherein said transmitting means sends the request signal corresponding to the authentication accuracies in accordance with said table information when information regarding said items is input thereto.

11. A central authentication device connected to the in-vehicle antitheft device as claimed in claim 3 through a communication line, the central authentication device comprising:

storage means for storing different kinds of user information therein;

a plurality of different user authentication means having said authentication accuracies corresponding to the different kinds of user information stored in said storage means; and notification means for notifying said in-vehicle antitheft device of a result of the user authentication by at least one of said plurality of user authentication means.

12. The in-vehicle antitheft device as claimed in claim 5, wherein a number of times of said resend is limited to a predetermined number of times.

13. The central authentication device as claimed in claim 11, further comprising table information indicating a correspondence relationship between items of said vehicle functions and the authentication accuracies required for use permission of the items, wherein said notification means notifies said in-vehicle antitheft device of a result of the user authentication performed by said user authentication means having the authentication accuracy determined in accordance with said table information.

14. The central authentication device as claimed in claim 11, wherein said notification means notifies said in-vehicle antitheft device of a result of the user authentication by regarding that the user authentication is completed in agreement, when there is permission information from a correct user, irrespective of whether or not the user authentication is completed in agreement.

15. The central authentication device as claimed in claim 11, further comprising abnormality detecting means for notifying of an occurrence of an abnormality in said vehicle when a movement of said vehicle is detected for a time longer than a predetermined time period or a distance longer than a predetermined distance after said user authentication is completed in disagreement, and requesting said vehicle to transmit vehicle position information.

16. The central authentication device as claimed in claim 11, wherein said user authentication means uses authentication again when the user authentication does not satisfy a predetermined agreement benchmark but satisfies a predetermined quasi-agreement benchmark that is expanded on a disagreement side.

* * * * *

UNITED STATES PATENT AND TRADEMARK OFFICE
CERTIFICATE OF CORRECTION

PATENT NO. : 7,679,486 B2  Page 1 of 1
APPLICATION NO. : 11/216079
DATED : March 16, 2010
INVENTOR(S) : Hiroki Okada It is certified that error appears in the above-identified patent and that said Letters Patent is hereby corrected as shown below:

Title page,
Item [73], Assignee, "Toyota Hidosha Kabushiki Kaisha", assignee should read -- Toyota Jidosha Kabushiki Kaisha --

Signed and Sealed this

Twenty-second Day of June, 2010

David J. Kappos
*Director of the United States Patent and Trademark Office*